Patented Oct. 15, 1946

2,409,455

UNITED STATES PATENT OFFICE 2,409,455

TETRAACETYL RIBONIC ACID AND PROCESS OF MAKING IT

Max Tishler, Rahway, N. J., assignor to Merck & Co., Inc., Rahway, N. J., a corporation of New Jersey No Drawing. Application May 21, 1941, Serial No. 394,505

2 Claims. (Cl. 260—488)

This invention relates to tetraacetyl ribonic acid and a process of making it, and is a continuation-in-part of co-pending application Serial No. 325,182, filed March 21, 1940, Patent No. 2,261,608.

I have discovered that tetraacyl ribonamide may be obtained by acetylating ribonamide, tetraacyl ribonic acid may be obtained by treating tetraacyl ribonamide with nitrous anhydride, and that tetraacyl ribonic acid chloride may be obtained by treating tetraacyl ribonic acid with phosphorous pentachloride.

The latter compound may be reduced to tetraacetyl ribose which may then be used in the synthesis of riboflavin.

The following examples illustrate methods of carrying out the present invention, but it is to be understood that these examples are given by way of illustration and not of limitation.

Example I

Fifteen grams of ribonamide are added to a mixture of 74 cc. of acetic anhydride and 75 cc. of dry pyridine. The suspension is warmed with agitation until the solid dissolves. The solution is allowed to stand overnight at room temperature. The tetraacetyl ribonamide which crystallizes out of the reaction mixture is filtered off. Yield (first crop) =14.7 g.; M. P. 124–5° C.

The filtrate is added with stirring to 200 cc. of ice water and allowed to stand in an ice bath for one hour. A second crop is filtered off, and washed with water, followed by 95% alcohol and ether. Yield (second crop) =6.3 g.; M. P. 123.5–124.5° C.

The filtrate from the second crop is extracted with 4×50 cc. of CHCl₃. The CHCl₃ extract is washed with dilute (5%) NaHCO₃ solution, and then with water. The CHCl₃ solution is dried over Na₂SO₄, and evaporated under reduced pressure to dryness. The residue is washed with ether. Yield (third crop) =3.2 g.; M. P. 123–123.5° C. Total yield=24.2 g. or 80% of theory.

Example II

Twenty-six grams of cadmium ribonate (prepared from calcium d-arabinate by epimerization) are dissolved in 150 cc. of water, by heating on a steam bath. While the mixture is being heated to 60–70° C., hydrogen sulfide is passed into the solution with stirring until a filtered test portion no longer reacts with hydrogen sulfide. The mixture is filtered and the cadmium sulfide washed with hot water. The washings and filtrates are combined and concentrated under reduced pressure to dryness. The residue is then heated at 80–90° C. under reduced pressure for one hour. The syrupy lactone on standing slowly crystallizes but for subsequent operations, the syrup may be used without any purification.

The syrupy lactone is dissolved in 150 cc. of absolute alcohol by warming. The solution is then cooled to 5° C., and while stirring, a solution containing two equivalents of ammonia and methyl alcohol is added dropwise. The mixture immediately becomes turbid and the product begins to separate very soon. As soon as the product begins to separate, the rate of ammonia addition may be greatly increased. The mixture is allowed to stand at between 0° and 5° C. for two hours after all the ammonia has been added, is then filtered, and the d-ribonamide washed with cold methyl alcohol. Yield, 16.5 to 17.5 g., M. P. 138–139° C., with decomposition. An additional small crop of product may be obtained by concentrating the mother liquor under reduced pressure. Methyl alcohol may also be used as a solvent with no difference in yield.

A mixture of 10 g. of d-ribonamide, 38 cc. of acetic anhydride and 50 cc. of dry pyridine is heated on a steam bath until solution occurs, and then for an additional 15 minutes. The solution is then allowed to stand for ½ hour at room temperature. Ice is added together with seeds of the acetylated amide. After filtering off the crystalline material, the mother liquor is extracted with chloroform, washed, dried, and concentrated. The residue is taken up in ether and diluted with petroleum ether whereby an additional yield of product separates. The tetraacetyl d-ribonamide may be purified by recrystallization from methyl alcohol and melts at 125–6° C. Yield 82%.

Alternatively, a mixture of 200 g. of d-ribonamide, 175 g. of fused zinc chloride, and 1200 cc. of acetic anhydride is stirred at 5° C. for two hours. During this time the ribonamide dissolves. The mixture is then placed in the cold room at about 3° C. for ten hours. The solution, which becomes dark on standing, is poured into three liters of ice water, and, while stirring and maintaining the temperature below 25° C., a solution of 260 g. of sodium hydroxide in 500 cc. of water is added. The mixture is then filtered and the product recrystallized. An additional quantity of product may be obtained from the mother liquor by extracting with chloroform and proceeding as described above. Yield 227 g.

*Example III*

Ten grams of tetraacetyl ribonamide in 40 cc. of glacial acetic acid are treated with $N_2O_3$ at 8–10° C. until the evolution of $N_2$ ceases. After the reaction mixture has stood overnight in the refrigerator (0–5° C.), it is added to a mixture of 175 cc. of water and 75 g. of $NaHCO_3$. The alkaline solution is made acid to congo by the addition of dilute HCl (1–1), and warmed on the steam bath to 40° C. The acidic solution is cooled and extracted with $CHCl_3$. The $CHCl_3$ extract is dried over $Na_2SO_4$, and evaporated under reduced pressure. Yield of tetraacetyl ribonic acid=9.45 g. (94.5% of theory); M. P. 131–3° C. Upon recrystallization from dry toluene, it melts at 136–8° C.

The product may also be isolated after treatment with nitrous anhydride by concentrating the acetic acid solution under dryness to a syrup. The syrup is then taken up in a little ether, and allowed to crystallize. About 88% yield is obtained by this procedure.

*Example IV*

Ten grams of tetracetyl ribonic acid is suspended in 100 cc. of dry benzene, and 15–20 cc. of the benzene is distilled off to remove any residual water. The suspension is allowed to cool to room temperature, and 6.85 g. of $PCl_5$ are added. The reaction mixture is allowed to stand 24 hours with occasional shaking. The small amount of suspended matter is filtered off, and the solution evaporated under reduced pressure to dryness at a bath temperature of 50–60° C. The crude tetraacetyl ribonyl chloride is recrystallized from a mixture of ether-petroleum ether. Yield=6.9 g. (73% theory); M. P. 70–71° C.

Other acyl derivatives may be obtained by employing different aliphatic or aromatic acids or anhydrides as starting materials.

Modifications may be made in carrying out the present invention without departing from the spirit and scope thereof, and I am to be limited only by the appended claims.

I claim:

1. As a new product, tetraacetyl ribonic acid.
2. The process comprising reacting tetraacetyl ribonamide with nitrous anhydride.

MAX TISHLER.